(12) United States Patent
Little

(10) Patent No.: US 6,691,519 B2
(45) Date of Patent: Feb. 17, 2004

(54) ADAPTABLE MODULAR GAS TURBINE POWER PLANT

(75) Inventor: David Allen Little, Oviedo, FL (US)

(73) Assignee: Siemens Westinghouse Power Corporation, Orlando, FL (US)

( * ) Notice: Subject to any disclaimer, the term of this patent is extended or adjusted under 35 U.S.C. 154(b) by 0 days.

(21) Appl. No.: 09/769,973

(22) Filed: Jan. 25, 2001

(65) Prior Publication Data

US 2001/0032450 A1 Oct. 25, 2001

Related U.S. Application Data

(60) Provisional application No. 60/183,512, filed on Feb. 18, 2000.

(51) Int. Cl.[7] .................................................. F02C 7/20
(52) U.S. Cl. ........................... 60/798; 60/805; 415/912
(58) Field of Search ........................... 60/739, 796, 798, 60/805, 804; 415/175, 912

(56) References Cited

U.S. PATENT DOCUMENTS

| | | | | |
|---|---|---|---|---|
| 2,704,439 | A | * 3/1955 | Cousins ..................... | 60/798 |
| 3,140,821 | A | * 7/1964 | Weckwert et al. .......... | 415/175 |
| 3,565,545 | A | * 2/1971 | Bobo et al. ................. | 60/805 |
| 3,657,883 | A | * 4/1972 | De Corso .................... | 60/796 |
| 3,775,975 | A | * 12/1973 | Stenger et al. ............. | 60/739 |
| 3,842,595 | A | * 10/1974 | Smith et al. ................ | 60/804 |
| 3,914,842 | A | * 10/1975 | Bruckhoff et al. .......... | 415/912 |
| 4,037,404 | A | * 7/1977 | Bougain ..................... | 60/796 |
| 4,418,528 | A | 12/1983 | Pellow | |
| 4,456,425 | A | 6/1984 | McCarty et al. | |
| 4,586,225 | A | 5/1986 | Bouiller et al. | |
| 4,934,140 | A | 6/1990 | Dennison et al. | |
| 5,017,088 | A | 5/1991 | Miraucourt et al. | |
| 5,022,145 | A | 6/1991 | Brawerman et al. | |
| 5,220,784 | A | 6/1993 | Wilcox | |
| 5,222,360 | A | 6/1993 | Antuna et al. | |
| 5,267,397 | A | 12/1993 | Wilcox | |
| 5,520,512 | A | 5/1996 | Walker et al. | |
| 5,524,430 | A | 6/1996 | Mazeaud et al. | |
| 5,772,400 | A | 6/1998 | Pellow | |

FOREIGN PATENT DOCUMENTS

| | | |
|---|---|---|
| DE | 24 08 641 A | 8/1975 |
| DE | 44 25 352 A | 1/1996 |
| GB | 138 070 A | 9/1920 |
| WO | WO 86 06790 A | 11/1986 |

* cited by examiner

Primary Examiner—Michael Koczo

(57) ABSTRACT

A combustion turbine power plant includes a modular compressor assembly structured to enclose multiple configurations of vanes and blades, a modular combustor assembly structured to be disengagably coupleable to a fuel source, a modular first turbine assembly structured to enclose multiple configurations of vanes and blades, a modular diffuser, a modular second turbine unit, a work unit, and a modular heat exchange system. A work unit shaft is structured to have two ends that are disengagably coupleable to the modular second turbine unit and the work unit. A compressor turbine shaft is structured to have two ends that are disengagably coupleable to the modular compressor assembly and the modular compressor turbine assembly.

9 Claims, 5 Drawing Sheets

ADAPTABLE MODULAR GAS TURBINE POWER PLANT

CROSS REFERENCE TO RELATED APPLICATION

This application claims the benefit of U.S. Provisional Application Ser. No. 60/183,512, filed Feb. 18, 2000.

BACKGROUND OF THE INVENTION

1. Field of the Invention

This invention relates to an adaptable, modular, flexible, efficient gas turbine power plant and, more specifically, to a gas turbine power plant having a modular base structure and an adjustable heat exchange system which can be adapted to the modular base system throughout the life cycle of the base structure.

2. Background Information

A typical gas turbine power plant is constructed to meet the requirements of a single application. Such a construction includes several components, typically comprising a compressor assembly, a combustor assembly, a turbine assembly and a generator. The system may further include a diffuser and an additional turbine. In a two-turbine configuration, the first turbine is mechanically coupled to the compressor by a shaft and the second turbine is mechanically coupled by a shaft to a generator, pump, or compressor. The casing for each of these components and the heat exchange system will be structured for maximum efficiency for the single application for which the system was designed.

In operation, the compressor assembly compresses ambient air. The compressed air flows into the combustor assembly where it is mixed with a fuel. The fuel and compressed air mixture is ignited creating a heating working gas. The heated working gas is expanded through the turbine assembly. The turbine assembly includes a plurality of stationary vanes and rotating blades. The rotating blades are coupled to a central shaft. The expansion of the working gas through the turbine section forces the blades, and thereafter the shaft, to rotate. The shaft may be connected to the compressor and/or a generator. If two turbine assemblies are used, the first turbine assembly is coupled to the compressor assembly and the second turbine unit is coupled to a work unit such as a generator, pump, or compressor.

The drawback to such a system is that, should the user requirements change or should improved components become available, the system cannot easily be adapted to a different configuration. Alternatively, the user may buy less expensive components to reduce start-up costs, then at a later time wish to upgrade the system. Prior art systems are not structured to easily upgrade individual components.

Accordingly, there is a need for a gas turbine power plant which is adaptable to various applications for which the system may be used.

There is a further need for a gas turbine power plant which is adaptable to new technologies.

SUMMARY OF THE INVENTION

These needs, and others, are met by the disclosed invention which provides a gas turbine power plant system having a plurality of modular components such as a compressor unit, a combustion unit, a first turbine unit, which is coupled to the compressor unit, an intermediate unit, and a second turbine unit, which is coupled to a work unit. A flow path exists through the compressor unit, combustion unit, first turbine unit, intermediate unit and second turbine unit. The compressor unit, combustion unit, intermediate unit, first turbine unit, and second turbine unit are further coupled by a modular modular heat exchange system which is structured to retain energy within the system.

Each unit has a casing that is structured to cooperate with a variety of other units. For example, both turbine units are structured to allow a variety of combustor units to be used, depending on the type of fuel and the emissions requirements of the fuel used. The modular heat exchange system may also be adapted to various applications. The casings for the gas compressor unit, combustor unit, intermediate unit, first turbine unit and second turbine unit are structured to allow the changes to the modular heat exchange system and structured to meet the requirements of various applications. The casing of each unit has an interface with the casing(s) of the adjacent units. Alternate units are structured so that the casing of the alternate unit engages the adjacent unit casing(s).

Thus, the invention provides for a combustion turbine power plant that includes a first plurality of modular components structured to form a combustion turbine power plant and a second plurality of modular components performing corresponding functions of the first plurality of components but having different operating characteristics. The modular components of the first and second plurality of modular components have an interface with an adjacent modular component. The corresponding modular components of the first and second plurality of modular components have a corresponding interface so that the corresponding modular components of the first and second plurality of modular components may be interchanged.

BRIEF DESCRIPTION OF THE DRAWINGS

A full understanding of the invention can be gained from the following description of the preferred embodiments when read in conjunction with the accompanying drawings in which:

FIG. 2A shows a schematic representation of an alternate set of modular components for use in the combustion turbine system shown in FIG. 2;

DETAILED DESCRIPTION OF THE PREFERRED EMBODIMENT

As used herein, a "mature" combustion turbine indicates that the combustion turbine has reached its development potential both in terms of first turbine inlet temperature and component technologies.

Figure 1:
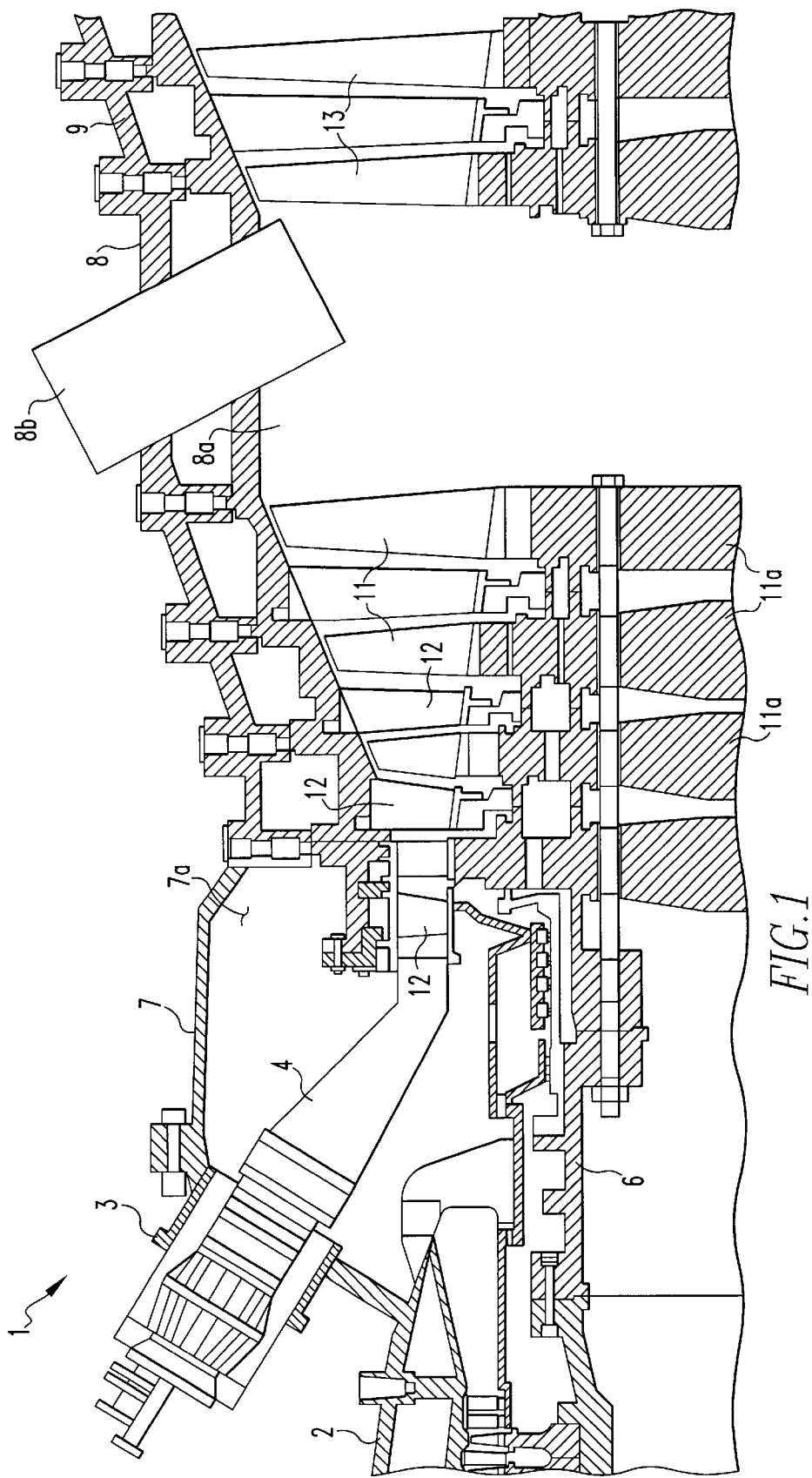
FIG. 1 shows a cross-sectional view of a combustion turbine.

As is well known in the art and shown in FIG. 1, a combustion turbine 1 includes a compressor assembly 2, a combustor assembly 3 with a transition section 4 or alternately an annular combustor, and a first turbine assembly 5. A flow path exists through the compressor 2, combustor assembly 3, transition section 4, and first turbine assembly 5. The first turbine assembly 5 is mechanically coupled to the compressor assembly 2 by a central shaft 6. Outer casing 7 creates a compressed air plenum 7a. Typically, the outer casing 7 encloses a plurality of combustor assemblies 3 and transition sections 4. The combustor assemblies 3 and the transition sections 4 are disposed circumferentiality about the central shaft 6. The system may further include an intermediate unit 8 and a second turbine assembly 9. The intermediate unit 8 may be either a diffuser 8a, a reheat combustor 8b, or a mixer. The second turbine assembly 9 may be coupled by a shaft to a work unit 80 (FIG. 2) such as generator, a pump, or compressor.

In operation, the compressor assembly 2 inducts ambient air and compresses it. The compressed air travels through the flow path to compressed air plenum 7a defined by casing 7. Compressed air within the compressed air plenum 7a enters a combustor assembly 3 where the compressed air is mixed with a fuel and ignited to create a working gas. The working gas passes from the combustor assembly 3 through transition section 4 and into the first turbine assembly 5. In the first turbine assembly 5 the working gas is expanded through a series of rotatable blades 11, which are coupled by a rotor stack 11a a to shaft 6 and the stationary vanes 12. As the working gas passes through the first turbine assembly 5, the blades 11 and shaft 6 rotate creating a mechanical torque which drives the compressor assembly 2. The working gas then passes through the intermediate unit 8, where the pressure of the working gas decreases while the temperature may be increased in a reheat combustor 8b. Finally, the gas is expanded through the second turbine assembly 9 having a series of rotating blades 13 and stationary vanes 14. The second turbine blades 13 are coupled to a shaft to create a rotational force. The second turbine shaft can be coupled to a generator to produce electricity, or to a pump or compressor.

Figure 2:
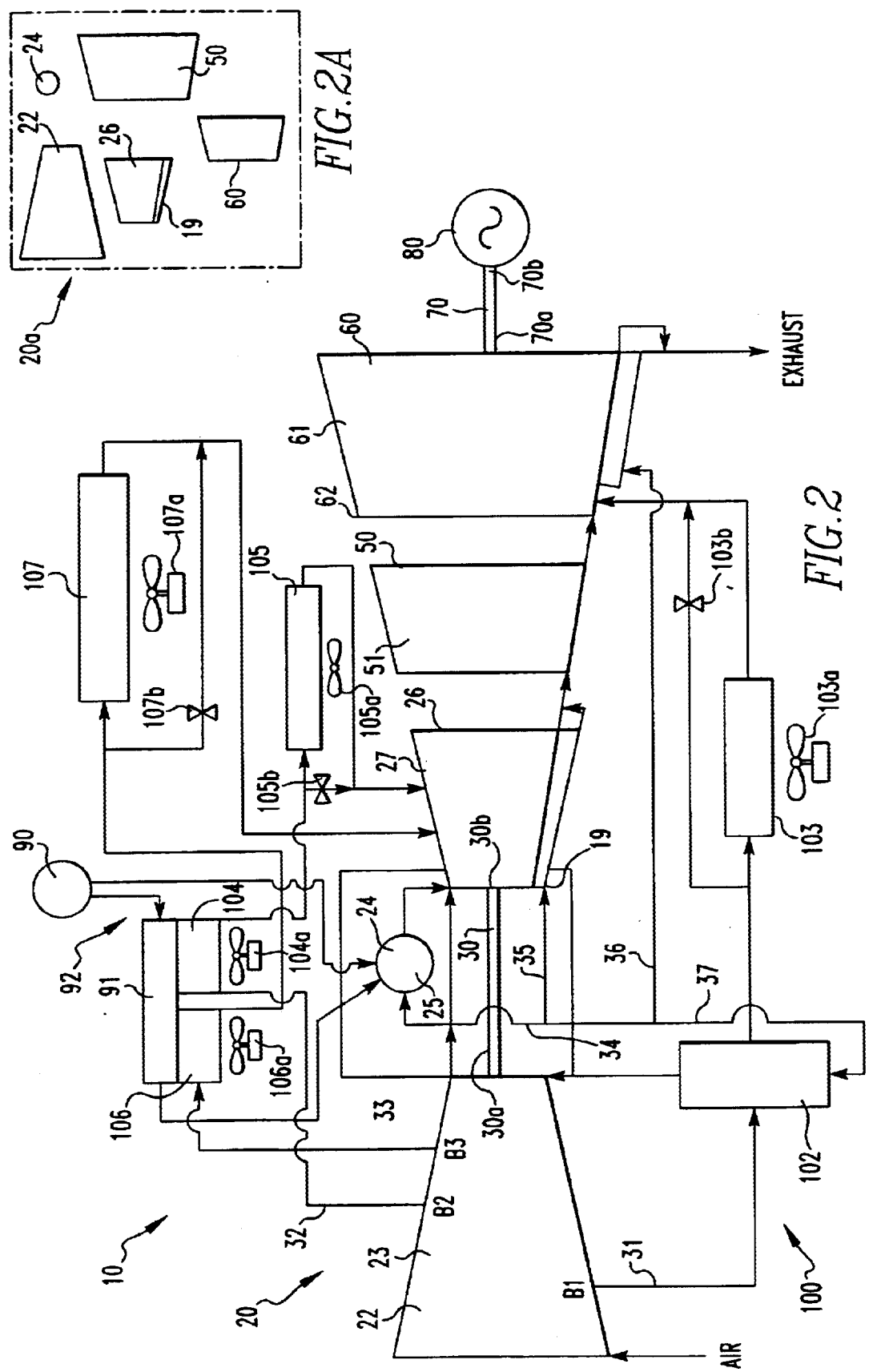
FIG. 2 shows a schematic representation of a combustion turbine system with a modular heat exchange system configured for simple cycle peaking duty.

As shown in FIG. 2, a modular gas turbine power plant system 10 includes a first plurality of modular components 20, such as a modular compressor unit 22, a modular outer casing 19, a modular combustor unit 24, a modular first turbine unit 26, a modular intermediate unit 50, a modular second turbine unit 60 and a work unit 80. A modular intermediate unit 50 may be located between the first turbine unit 26 and the second turbine unit 60. A second plurality of modular components 20a include corresponding components to the first plurality 20, the second plurality of modular components 20a, however, have different operating characteristics.

The modular compressor unit 22 has a casing 23, the modular combustor unit has a casing 25 and the modular first turbine unit has a casing 27, the modular intermediate unit 50 has a casing 51 and the modular second turbine unit 60 has a casing 61. The modular compressor unit casing 23, modular outer casing 19, modular combustor unit casing 25, modular first turbine unit casing 27, modular intermediate unit casing 51 and modular second turbine unit casing 61 form a continuous flow path therethrough.

Thus, each of the plurality of components 20 has a casing 23, 25, 27, 51, 61. Between each of the plurality of components is an interface. The casings 23, 25, 27, 51, 61 of adjacent components are structured to engage each other. An alternate component is structured to have a casing that will engage the adjacent component(s). Thus, the casings of each of components 23, 25, 27, 51, 61, as well as the casing of alternate components, are structured to engage each of the adjacent component casings 23, 25, 27, 51, 61, as well as alternate component casings.

A compressor-turbine shaft 30 mechanically couples the modular compressor unit 22 to the modular first turbine unit 26. The compressor-turbine shaft 30 has two ends 30a, 30b which are structured to be disengagably coupleable to the modular compressor unit and to the modular first turbine unit. As used herein, disengagably coupleable means that the component is preferably structured to be engaged or disengaged with an associated component or unit. However, it should be understood that "disengagably coupleable" shall also include other means of engagement that can be practically disengaged in a manner that permits reattachment.

A generator shaft 70 couples the modular second turbine unit 60 to the work unit 80. The generator shaft 70 has two ends 70a, 70b which are structured to be disengagably coupleable to the modular second turbine unit and the work unit 80.

The modular compressor unit 22 can be one of a variety of high-pressure ratio compressors. The modular compressor unit 22 is adaptable to cooperate with an integrated gasification combined cycle (IGCC), advanced pressurized fluidized bed combustion (APFBC), gas turbine/solid oxide fuel cell (GT/SOFC) hybrid cycles, as well as other emerging power plant cycles. The modular compressor unit 22 contains a plurality of rows of stationary vanes and rotating blades (not shown). The modular compressor unit casing 23 is structured to enclose multiple configurations of vanes and blades, where the rows of vanes and blades may have more than one shape.

The modular compressor unit is structured to be disengagably coupleable to the compressor-turbine shaft 30. As such, the modular compressor unit 22 may be easily disengaged from the power plant system 10. An alternate modular compressor unit 22 could then be installed in the first modular compressor unit's 22 place. Any alternate modular compressor unit 22 is also structured to be disengagably coupleable to the compressor-turbine shaft 30. The modular compressor unit casing 23 is structured to be disengagably coupleable to modular outer casing 19.

The modular combustor unit 24 may be one of a variety of combustor assemblies. For example, one modular combustor unit 24 is structured to burn natural gas. Another modular combustor unit 24 is structured to burn synthetic gas, such as the gas produced by a IGCC system. The modular combustor unit 24 is structured to be disposed within a modular outer casing 19 within a plenum filled with compressed air from the modular compressor unit 22. The modular combustor unit 24 mixes compressed air with a fuel and ignites the mixture to create a working fluid. The modular combustor unit 24 has a fuel inlet means and an igniter assembly (not shown) The fuel inlet means is structured to be disengagably coupleable to a fuel supply 90. The alternate modular combustor units 24 are also structured to be disengagably coupleable to fuel supply 90. As such, the modular combustor unit 24 may be easily replaced with an alternate modular combustor unit 24. The modular outer casing 19 is structured to accommodate fuel inlet lines of various sizes.

The modular first turbine unit 26 is structured to be disengagably coupleable to the compressor turbine shaft 30. The modular compressor unit casing 23 is structured to be disengagably coupleable to modular outer casing 19. The downstream end of the first turbine unit 26 is structured to be disengagably coupleable to the modular intermediate unit 50.

The modular first turbine unit 26 includes a plurality of stationary vanes and rotating blades (not shown). One form of modular first turbine unit 26 is structured to include a cooling system (as described below) for the casing 27 and the vanes and/or blades. The modular intermediate unit 50 is structured to be disengagably coupleable to both the modular first turbine unit 26 and the modular second turbine unit 60. One form of the modular intermediate unit 50 includes a reheat combustor 53 (FIG. 4) that is structured to reheat the working gas before the working gas enters the modular second turbine unit 60.

The modular second turbine unit 60 is structured to be disengagably coupleable to the modular intermediate unit 50 and the generator shaft 70. The second turbine unit 60 includes a plurality of stationary vanes and rotating blades (not shown). One form of second turbine unit 60 is structured to include a cooling system (as described below) for the casing 61 and the vanes and/or blades. Modular second turbine units 60 are structured for either 50 Hz or 60 Hz applications. The modular second turbine unit 60 may include an in-situ reheat device for re-heating the working gas within the modular second turbine unit 60.

The work unit 80 is, preferably, either a 50 or 60 Hz generator. The work unit 80 is structured to be disengagably coupleable to the generator shaft 70.

The compressor turbine power plant assembly 10 is made more efficient by a modular heat exchange system 100. The modular heat exchange system 100 includes a plurality of closed and open heat exchange units. As used herein a "closed heat exchange unit" is a heat exchange unit having two closed fluid lines which exchange heat with each other. When two lines exchange heat with each other, the two lines will be said to "interact" with each other. Because, however, the lines are closed, the two fluids do not mix. A "open heat exchange unit" is a heat exchange unit which allows ambient air to interact with a closed line thereby transferring energy to the atmosphere. As used herein, "openly coupled" means that heated air from one heat exchange unit is moved over a second heat exchange unit, thereby heating the second heat exchange unit. The fluid within the first heat exchange units does not, however, interact with the fluid in the second heat exchange unit.

The modular compressor unit casing 23 is structured to allow at least three bleed lines 31, 32, and 33 to draw compressed air out of the compressor. The first bleed line 31 is drawn from the most upstream location of the flow path as compared to the remaining bleed lines. The first bleed line, however, cannot be drawn from a location upstream of the first stage compressor blades. As such the first bleed line 31 draws the coolest compressed air. The second bleed line is drawn from a location downstream in the flow path from the first bleed line 31. As such the second bleed line 32 transfers air that is at both a higher temperature and a higher pressure than the first bleed line 31. The third bleed line is drawn from a location further downstream along the flow path than the second bleed line 32. Accordingly, the compressed air within bleed line three 33 is at a higher pressure and temperature than the air in the second bleed line 32. Compressed air leaving the outlet of compressor unit 22 and entering the modular outer casing 19 is at its highest pressure and temperature. Compressed air from within modular outer casing 19 is divided into at least three portions. A first portion of this air is delivered to modular combustor unit 24, a second portion of this air is delivered via a primary casing bleed line 34 to the modular heat exchange system 100, and a third portion may pass to the modular first turbine unit 26.

The modular heat exchange system 100 is structured to use compressed air from the three bleed lines and compressed air drawn from the second portion of air in the modular outer casing 19. As will be described below, the modular heat exchange system 100 may be set up in a variety of configurations. In each configuration, however, the air within the various loops formed by the different bleed lines are at about the same pressure corresponding to the pressure of the individual bleed lines 31, 32, 33, 34.

Generally, the purpose of the modular heat exchange system 100 is to heat the fuel, and/or to cool the vanes and blades of the first turbine unit 26 and the second turbine unit 60, or heat the first turbine unit casing 27 or the second turbine unit casing 61 so that the tip clearance between the blades within the first turbine unit 26 and the second turbine unit 60 are within the optimal distance from each other.

The first turbine unit 26 and the second turbine unit 60 operate most efficiently when the rotating blades within the turbines 26, 60 are at an optimal distance from the casings 27 and 61. To insure that the spacing between the blades and casings 27 and 61 remains optimal, the casings 27 and 61 may be selectively heated, thereby causing a controlled thermal expansion or the rotating blades and rotor stack 11*a* may be cooled to selected temperatures, thereby causing a controlled thermal contraction.

The modular heat exchange system 100 is structured to be disengagably coupleable to the modular compressor unit casing 23, the modular combustor assembly 24, the modular first turbine unit casing 27, the modular intermediate unit casing 51 and the modular second turbine unit casing 61. Internal channels (not shown) within the modular first turbine unit casing 27 and the modular second turbine unit casing 61 allow the modular heat exchange system 100 to be in fluid communication with the blades and vanes of the modular turbine assemblies 26, 60.

As shown in FIG. 2, a power plant 10 configured as a simple cycle peaking duty power plant includes a modular heat exchange system configured as follows. The first bleed line 31 is in fluid communication with a first closed heat exchange unit 102. The first closed heat exchange unit is further in fluid communication, via third casing bleed line 37 (described below). In the first closed heat exchange unit 102, air in line 31 interacts with the air in third casing bleed line 37, raising the temperature of the first bleed line 31 and lowering the temperature of the third casing bleed line 37. The air in third casing bleed line 37 is passed back into the modular compressor unit 22 at the downstream end of the compressor unit 22. The first bleed line 31 is in further fluid communication with the first open heat exchange unit 103. To facilitate heat exchange within the first open heat exchange unit 103 the unit may include a fan 103(*a*) or other such means to force air through and/or across the heat exchange unit. Preferably, at steady state system operation air from the first bleed line 31 bypasses the first open heat exchange unit 103 by opening bypass valve 103*b*. During start up and shutdown sequences, cooling air will be directed to the rotor stack 11*a* to cause the rotor stack 11*a* to shrink, thus pulling the blades away from the casing 27. At steady state, the rotor stack air is heated in a controlled manner to allow the rotor stack 11*a* to expand and causing the clearance between the blades and the casing 27 to be optimal. Use of the first closed and open heat exchange units 102, 103 permits control of the temperature of the air directed to cooling channels within the blades of the second turbine unit 60, thus allowing for tip clearance control.

First, second, and third casing bleed lines 35, 36, and 37 are in fluid communication with the compressed air in modular outer casing 19 through primary casing bleed line 34. Air from the first casing bleed line 35 is delivered directly to the modular first turbine unit casing 27 thereby heating the modular first turbine unit casing 27. The second casing bleed line 36 is coupled to modular second turbine unit casing 61. Air from the casing bleed lines 35, 36 may be used to heat the casings 27, 61 and thereby aid in tip clearance control.

Fuel is heated by the modular heat exchange system 100. Fuel from a fuel source 90 is delivered to a fuel delivery system 92. The fuel is preferably a combustible gas. A primary fuel heat exchange unit 91 is openly coupled to a second open heat exchange unit 104, which may include a fan 104(a). Heated air from the second bleed line 32 passes through second open heat exchange unit 104 and heats the fuel in the primary fuel heat exchange unit 91. The primary fuel heat exchange unit 91 is also openly coupled to a third open heat exchange unit 106, which may include a fan 106(a). Heated air from the third bleed line 33 passes through third open heat exchange unit 106 and further heats the fuel in primary fuel heat exchange unit 91. Fuel from the primary fuel heat exchanger 91 is then delivered to the modular combustor unit 24.

Air from the second bleed line 32 is then delivered to a fourth open heat exchange unit 105, which may include a fan 105(a), before it is delivered to the rotor stack of the first turbine unit 26. After the third open heat exchange unit 106, air within the third bleed line 33 is delivered to the rotor stack within the first turbine unit 26. Before being delivered to the first turbine unit 26, air from the third bleed line 33 may be passed through a fifth open heat exchange unit 107, which may include a fan 107(a) to adjust the temperature of the air from the third bleed line 33. Preferably, in the steady state both the fourth and fifth open heat transfer units 105 and 107 are bypassed using bypass valves 105b and 107b.

Figure 3:
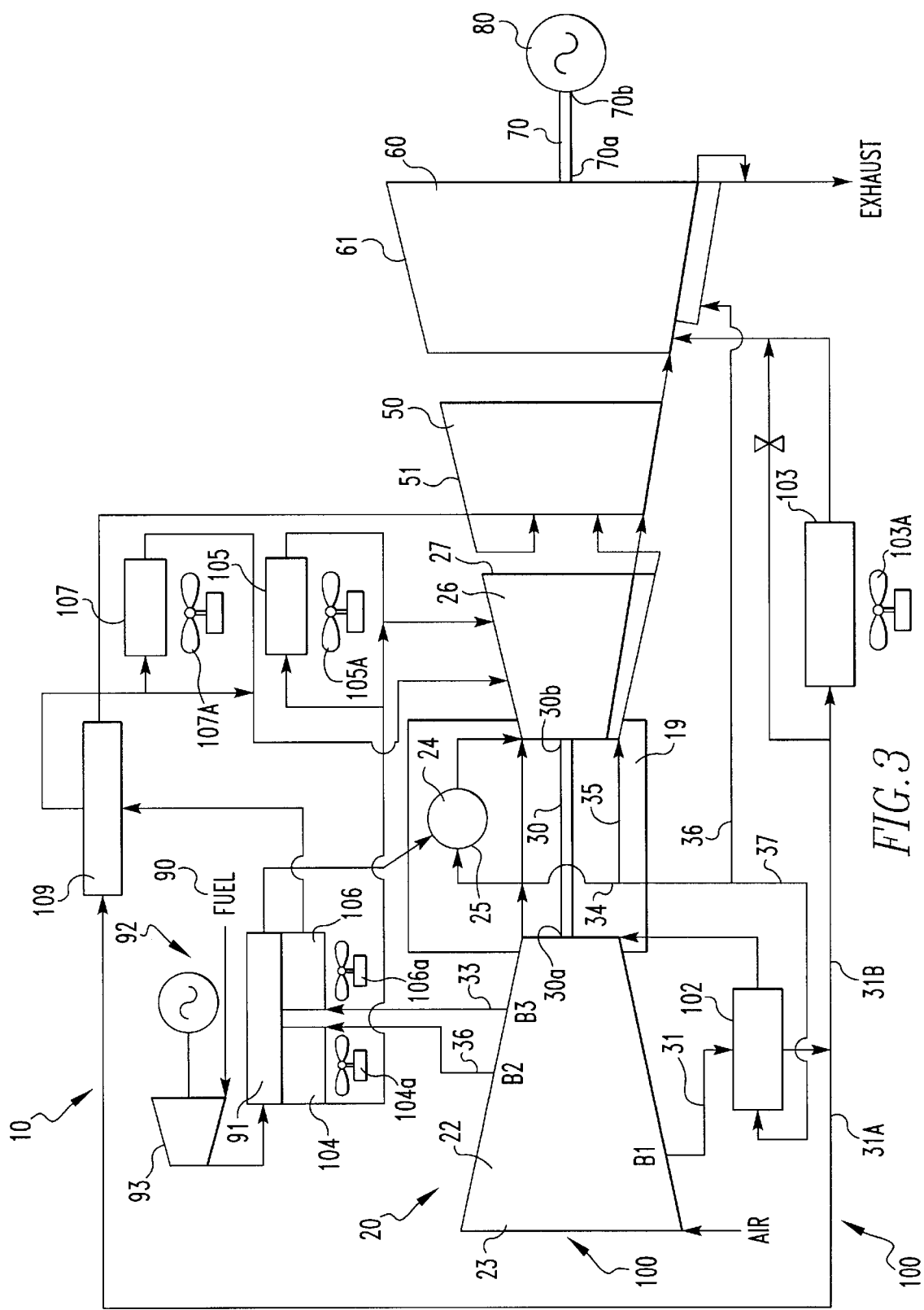
FIG. 3 shows a schematic for a mature combustion turbine power system with a modular heat exchange system configured for a mature simple cycle peaking duty.

The system disclosed in FIG. 2 may be adapted to a mature simple cycle peaking duty configuration as shown in FIG. 3, by reconfiguring the modular heat exchange system 100. This embodiment further includes a fuel compressor 93 and a second closed heat exchange unit 109. The fuel compressor 93 is disposed between the fuel supply 90 and the primary fuel heat exchange unit 91. The fuel compressor 93 raises the pressure of the fuel. The temperature of the fuel gas is raised in the primary fuel heat exchange unit 91 as described above.

After the first closed heat exchange unit 102, the first bleed line 31 is split into a first branch 31a and second branch 31b. Second branch 31b is in fluid communication with the first open heat exchange unit 103 and modular second turbine unit 60 blades, as described above. The second closed heat exchange unit 109 is in fluid communication with branch 31a. The second closed heat exchange unit 109 is further coupled to the third bleed line 33 and is disposed between third open heat exchange unit 106 and fifth heat exchange unit 107. As such, heat from the third bleed line 33 is transferred to the compressed air within bleed line 31a. Bleed line 31a is further coupled to the intermediate unit 50 where the compressed air within bleed line 31a is joined with the working fluid. Because heat is transferred from the third bleed line 33 to the compressed air in bleed line 31a, and then returned to the working gas before it flows through the second modular turbine unit 60, all of the heat taken from the third compressor bleed line 33 in cooling air in bleed line 31a is returned to the system, thus maximizing cycle efficiency.

Figure 4:
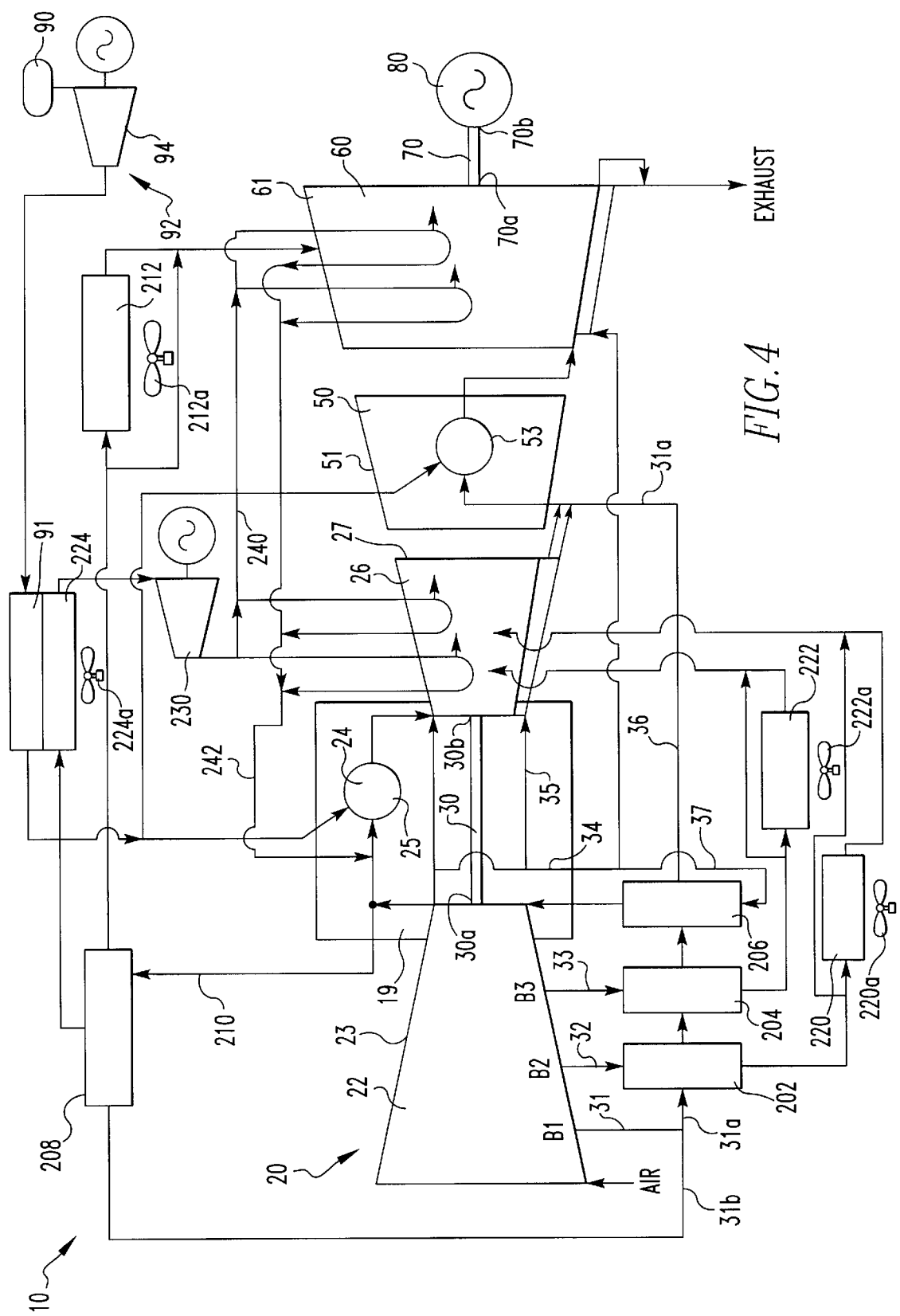
FIG. 4 shows a schematic for a combustion turbine power system having a modular heat exchange system configured for a mature reheat system for combined cycle.

The combustion turbine power plant system 10 can further be refined as shown in FIG. 4 to retain almost all engine heat within the working gas. In this configuration the modular heat exchange system 100 is structured to operate with a mature, reheat combined cycle power plant. Generally, the intermediate unit 50 is structured to include a reheat combustor 53, as noted above. Additionally, the modular heat exchange system 100 is structured to provide cooling air to the vanes in the first turbine assembly 26 and second turbine unit 60 in a partially closed loop cooling system, as described below. The first bleed line 31 is, again split into a first branch 31a and a second branch 31b. The first branch 31 a in this configuration is in fluid communication with a third, fourth, and fifth closed heat exchange units 202, 204, 206. The third closed heat exchange unit 202 is in fluid communication with the second bleed line 32. The first branch 31a and the second bleed line 32 interact in the third closed heat exchange unit 202 thereby heating the air in the first branch 31 a and cooling the air in the second bleed line 32. The first branch 31a is then coupled to fourth closed heat exchange unit 204. The fifth closed heat exchange unit 206 is in fluid communication with the third bleed line 33. The first branch 31a and the third bleed line 33 interact in the fourth closed heat exchange unit 204 thereby heating the air in the first branch 31a and cooling the air in the third bleed line 33. The fifth closed heat exchange unit 206 is coupled to the first branch 31a and in fluid communication with, via third casing bleed line 37, the modular outer casing 19. As before, third casing bleed line 37 and first branch 31a interact in fifth closed heat exchange unit 206, heating the air in branch 31a and cooling the air in line 37. The third casing bleed line 37 returns to modular compressor unit 22 as stated above. The first branch 31a is coupled to the working gas flow within the modular intermediate unit 50 upstream of the re-heat combustor 53.

The second and third bleed lines 32, 33, after fourth and fifth closed heat exchange units 204 and 206, respectively, are coupled to sixth and seventh open heat exchange units 220, 222. The sixth open heat exchange unit 220, which may include a fan 220a, is disposed on second bleed line 32 between the third closed heat exchange unit 202 and the modular first compressor assembly 26. The seventh open heat exchange unit 222, which may include a fan 222a, is disposed on third bleed line 33 between the third closed heat exchange unit 202 and the modular first turbine assembly 26. In steady state, the sixth and seventh open heat exchange units 220, 222 may be bypassed. The air in the second and third bleed lines 32, 33 joins the working gas flow path in the modular first turbine unit 26 after cooling the blades and vanes of the first turbine unit 26.

The second branch 31b is in fluid communication with a sixth closed heat exchange unit 208. The sixth closed heat exchange unit 208 is also in fluid communication, via a fourth casing bleed line 210, with the modular outer casing 19. In the seventh closed heat exchange unit air in the second branch 31b interacts with air in the fourth casing bleed line 210, thereby heating air in the second branch 31b and cooling air in the fourth casing bleed line 210. The second branch 31b is in further fluid communication with a eighth open heat exchange unit 212, which may include a fan 212a. After the eighth open heat exchange unit 212, the second branch 31b is in fluid communication with the vanes in the modular second turbine unit 60 via channels in the modular second turbine unit casing 61.

The fourth casing bleed line 210, after passing through the sixth closed heat exchange unit 208, is connected to an ninth open heat exchange unit 224. The ninth open heat exchange unit 224 is openly coupled to the primary fuel heat exchange unit 91. The fuel delivery system 92 also includes the fuel source 90 and a compressor 94 which raises the fuel pressure. After the fuel is compressed by compressor 94, the fuel passes through the primary fuel heat exchange unit 91. In the ninth open heat exchange unit 224, the air in the fourth casing bleed line 210 is cooled and hot air is delivered to the primary fuel heat exchange unit 91 thereby heating the fuel. The fuel then passes into the modular combustor assembly unit 24. The fourth casing bleed line 210 is in further fluid communication with a secondary compressor 230. Secondary compressor 230 raises the air pressure in fourth casing bleed line 210. Air from the fourth casing bleed line 210 is then passed through a partially closed loop vane cooling system 240. The partially closed loop vane cooling system 240 passes through the vanes in both the modular first turbine unit 26 and the modular second turbine unit 60. The partially closed loop cooling system 240 may still include an open loop that passes a portion of the air in the partially closed loop cooling system 240 into the flow path. Such an open loop portion of the partially closed loop cooling system 240 is used to cool the trailing edges of the vanes within both the modular first turbine unit 26 and the modular second turbine unit 60. Within the partially closed loop cooling system 240, the air absorbs heat from both the modular first turbine unit 26 and the modular second turbine unit 60. The heated air passes through a hot air exhaust line 242 which is in fluid communication with the modular combustor unit 24.

In this configuration, heat absorbed by the air in the partially closed loop cooling system 240 is maintained in the combustion turbine 1 thereby increasing the efficiency of the combustion turbine 1. In order to increase the efficiency of the combustion turbine 1, the user must provide a combustion turbine 1 having a modular compressor unit 22, a fuel system 92, a modular combustor unit 24, and at least one modular turbine unit 26. The modular compressor unit 22 includes bleed lines 31, 32, 33 and the modular turbine unit 26 is structured to be coupled to the bleed lines 31, 32, 33 and has rotors 11a structured to be cooled by said bleed lines 31, 32, 33. The rotors have an exhaust line 242 coupled to said combustor 24. The user must also provide a modular heat exchange system 100 having a plurality of heat exchange units and connect the heat exchange units to the bleed lines 31, 32, 33 so that the temperature of the rotors 11a may be selectively controlled. The user then passes air through the bleed lines 31, 32, 33 to selectively control the temperatures of the rotors 11a. The air heated by the rotors 11a is then delivered to the modular combustor unit 24.

Figure 5:
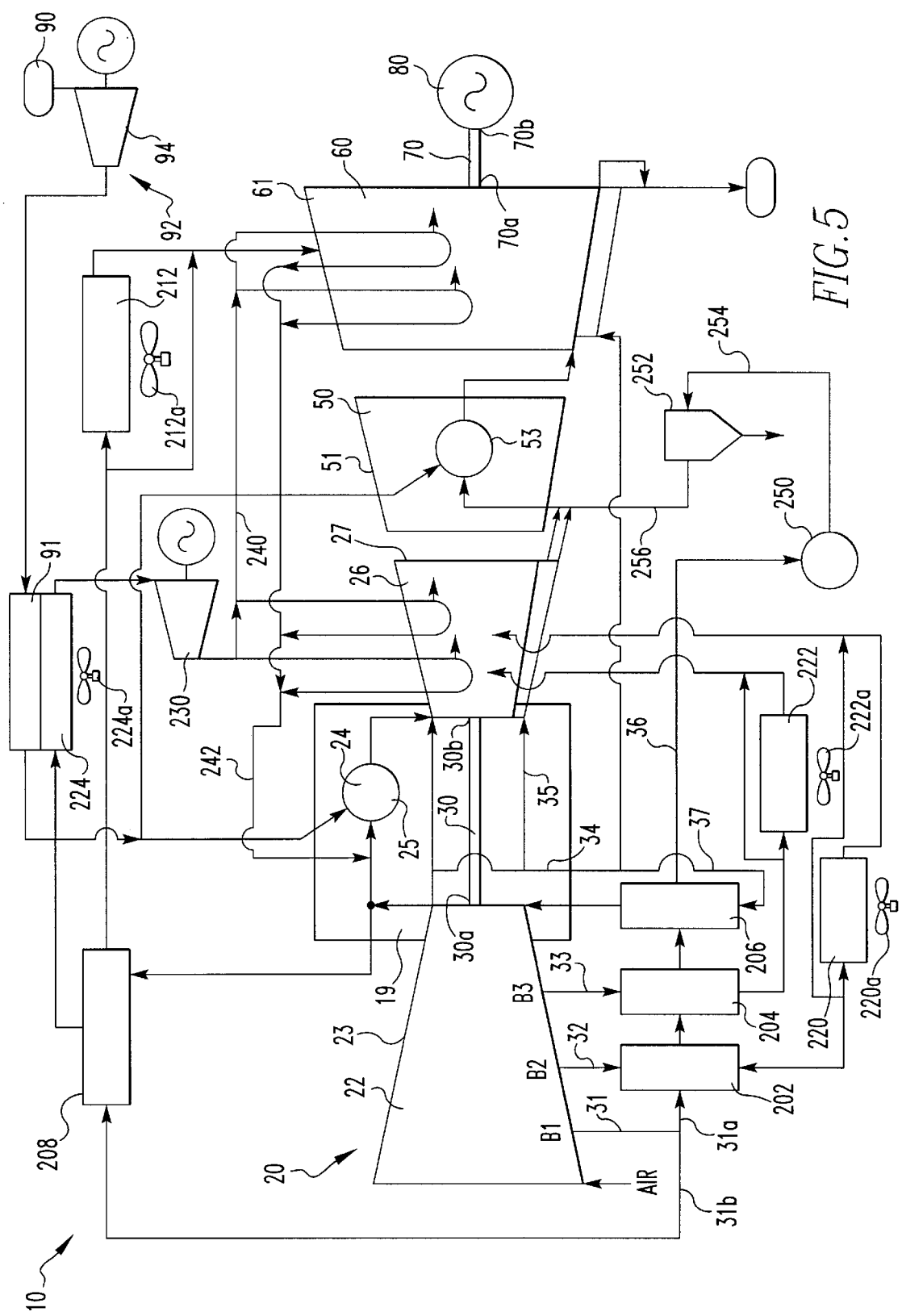
FIG. 5 shows a schematic for a combustion turbine power system with a modular heat exchange system configured for use with an external combustion module.

As shown in FIG. 5, air from the first bleed line 31 may be used to supply an external combustor assembly 250. The external combustor assembly 250 may burn a fuel such as pulverized coal. The external combustor assembly may be coupled to a filter 252. Within the external combustor assembly 250, air from the first bleed line 31 and more specifically the first branch 31a, is combined with a fuel and ignited, thereby raising the temperature of the air. The external combustor assembly 250 is in fluid communication with the filter 252 through external combustor conduit 254. Filter 252 is in fluid communication with the reheat combustor 53 via filter conduit 256 and the hot fluid stream leaving first modular turbine unit 26. The reheat combustor 53 combines a fuel with the heated air from filter conduit 256. The fuel/air mixture is ignited and the resulting gas joins the working gas flow path which extends through the modular second turbine unit 60.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of invention which is to be given the full breadth of the claims appended and any and all equivalents thereof.

What is claimed is:

1. A combustion turbine power plant comprising:
  a modular compressor unit having a casing;
  a modular outer casing structured to be disengagably coupleable to said modular compressor assembly casing;
  a modular combustor unit structured to be disengagably coupleable to a fuel source and disposed within said modular outer casing;
  a modular first turbine unit structured to be disengagably coupleable to said modular outer casing;
  a modular intermediate unit having a casing:
  a modular second turbine unit having a casing;
  said modular intermediate unit casing structured to be disengagably coupleable to said modular first turbine unit casing and said modular second turbine unit casing; and
  said modular second turbine unit structured to be disengagably coupleable to said modular intermediate unit casing; and
  a work unit, said work unit disengagably coupleable to said second turbine unit.

2. The combustion turbine power plant of claim 1 wherein:
  said work unit includes a shaft extending between said second turbine unit and said work unit; and
  said work unit shaft has an end that is disengagably coupleable to said modular second turbine unit.

3. The combustion turbine power plant of claim 2 wherein said work unit shaft has an end that is disengagably coupleable to said work unit.

4. The combustion turbine power plant of claim 1 wherein said modular intermediate unit includes a reheat combustor.

5. The combustion turbine power plant of claim 1 further comprising a modular heat exchange system wherein said modular heat exchange system includes a plurality of closed heat exchange units and open heat exchange units which are disengagably coupleable to said modular compressor unit, said modular combustor unit, said modular first turbine assembly, and said modular second turbine assembly.

6. The combustion turbine power plant of claim 5 wherein:
  said modular compressor unit casing includes a plurality of bleed lines;
  each said bleed lines being in fluid communication with one or more of said plurality of open and closed heat exchange units.

7. A combustion turbine power plant comprising:
  a modular compressor unit having a casing;
  a modular outer casing, which is separate from the compressor unit casing, structured to be disengagably coupleable to said modular compressor assembly casing;
  a modular combustor unit structured to be disengagably coupleable to a fuel source and disposed within said separate modular outer casing;
  a modular first turbine unit having a casing, said modular first turbine unit casing being separate from said modular outer casing, said modular first turbine unit casing structured to be disengagably coupleable to said modular outer casing;

a work unit coupled to said modular first turbine; and a modular heat exchange system wherein said modular heat exchange system includes a plurality of closed heat exchange units and open heat exchange units which are disengagably coupleable to said modular compressor unit, said modular combustor unit, said modular first turbine assembly, and said modular second turbine assembly.

8. A combustion turbine power plant comprising:

a modular compressor unit having a casing;

a modular outer casing structured to be disengagably coupleable to said modular compressor assembly casing;

a modular combustor unit structured to be disengagably coupleable to a fuel source and disposed within said modular outer casing;

a modular first turbine unit structured to be disengagably coupleable to said modular outer casing;

a work unit coupled to said modular first turbine; and a modular heat exchange system wherein said modular heat exchange system includes a plurality of closed heat exchange units and open heat exchange units which are disengagably coupeable to said modular compressor unit, said modular combustor unit, said modular first turbine assembly, and said modular second turbine assembly.

9. The combustion turbine power plant of claim 8 wherein:

said modular compressor unit casing includes a plurality of bleed lines;

each said bleed lines being in fluid communication with one or more of said plurality of open and closed heat exchange units.

* * * * *